(12) United States Patent
Fukada

(10) Patent No.: US 6,285,103 B1
(45) Date of Patent: Sep. 4, 2001

(54) PERMANENT MAGNETIC GENERATOR

(76) Inventor: Mitsuhiro Fukada, 3-9-25 Kamiosaki, Shinagawa-ku, Tokyo (JP)

(*) Notice: Subject to any disclaimer, the term of this patent is extended or adjusted under 35 U.S.C. 154(b) by 0 days.

(21) Appl. No.: 09/562,035

(22) Filed: May 1, 2000

(51) Int. Cl.$^7$ .................................................... H02K 21/00

(52) U.S. Cl. ............................ 310/152; 310/154; 310/98; 310/90; 310/90.5; 310/91; 310/75 R

(58) Field of Search ...................................... 310/152, 154, 310/89, 91, 98, 103, 254, 261, 75 R, 79, 80, 90.5, 90

(56) References Cited

U.S. PATENT DOCUMENTS

| | | | |
|---|---|---|---|
| 3,747,998 | * | 7/1973 | Klein et al. ............................. 308/10 |
| 3,899,223 | * | 8/1975 | Baermann .............................. 308/10 |
| 4,538,081 | * | 8/1985 | Kamiya et al. ........................ 310/90 |
| 5,220,227 | * | 6/1993 | Ohi ........................................ 310/156 |
| 5,314,868 | * | 5/1994 | Takahata et al. ..................... 505/166 |
| 5,959,383 | * | 9/1999 | Winzen et al. ...................... 310/90.5 |

* cited by examiner

Primary Examiner—Nestor Ramirez
Assistant Examiner—Thanh Lam
(74) Attorney, Agent, or Firm—Laubscher & Laubscher

(57) ABSTRACT

A permanent magnetic generator comprises a base 21 having fixedly a first magnetic body 23; a stator member 35 horizontally disposed above the base 21 through support members 27 and has a stator support 36; a drive-motor support 50 horizontally disposed and fixed to the support members 27 such that a space 61 is formed above the stator member 35; a rotoary shaft 55 penetrtes a first center hole 42 formed in the stator support 36 and a second center hole 51 formed in the drive-motor support 50 and is supported by means of bearing 43 and 52; a rotor 60 fixed to the rotary shaft 55 to be located within the space 61 and has annular permanent magnets 65 that face stator windings 38 of the stator member 35; a second magnetic body 56 fixedly attached to the projected lower end 55a of the rotary shaft 55 such that the second magnetic body 56 floats due to a repulsive force generated between the first and second magnetic bodies 23 and 56; a bearing member 80 attached to the drive-motor support 50 in order to support the rotary shaft 55 urged upward through the second magnetic body 56; and a drive motor 70 which is fixed to the drive-motor support 50 and is adapted to rotate the rotary shaft 55 through power transmission means 74 and 75 such that it allows a rotary performance of the rotary shaft improve.

8 Claims, 14 Drawing Sheets

PERMANENT MAGNETIC GENERATOR

TECHNICAL FIELD

The present invention relates generally to a permanent magnetic generator which can generate electricity by the use of a drive motor. The permanent magnetic generator can be prevented to happen to a cogging phenomenon (the revolving with a trembling caused by an attracted phenomenon of the magnetic force when a motor is started), the cost for manufacturing and its weight can be reduced. Also the present invention is suitable for mounting to real property or movable property such as a building, a mountain hut, a ship, an automobile, or the like.

BACKGROUND ART

An exemplary conventional permanent magnetic generator is disclosed in Japanese Patent application Laid-Open (kokai) No. 7-184360, in which a generator comprises an annular magnets (rotor) disposed North and South poles mutually to the direction of rotation, a stator (generative coil housing) have annular coils therein with projections (yoke projection) formed of the silicon steel plate as many poles, five pieces for example as the rotor into the annular magnet, and slits which are formed on the projection to the same direction of projection as respectively to decrease the electromotive force on the projection.

Although the permanent magnetic generator of the above-mentioned structure allows electromotive force decrease or cogging phenomenon control, there are problems as follows:
1. A weight of the permanent magnetic generator is heavy because the stator, made of silicon steel plate, is one of the its elements.
2. It is impossible to increase the amount of the generation of electricity because the annular magnets (rotor) do not have (super) strong magnetic flux density itself.
3. The rotation of the rotor is done inefficiently.
4. The permanent magnetic generator can not be improved to deminish the manufacturing cost and to reduce its size.

Then, the inventor suggested an exemplary conventional permanent magnetic generator as illustrated in FIGS. 12 to 14 to improve the above-mentioned problems (it does not remain non laid-opens when this application is filed).

The above-mentioned permanent magnetic generator comprises a support member 4 further which is composed of a pair of stationary columns 4a, 4a fixedly provided at the base 1 and a support arm 4b disposed horizontally and fixed to the upper ends of the columns 4a, 4a; a drive motor 5 which is supported fixedly at the support arm 4b of the support member 4 such that the drive motor 5 is centrally located with respect to the axis of the permanent magnetic rotor 10; a rotary shaft having an elongated bar-like shape, the upper end 6a of the rotary shaft 6 coaxially connected to the output shaft 5a of the drive motor 5 via a coupling 7, while the lower end 6b of the rotary shaft 6 entering an inverted-conical depression 3 to be supported by the bearing at the base 1; a permanent magnetic rotor 10 fixed to the rotary shaft, having a plurality of permanent magnets 12a, 12b, or the like; and a stator 15 having a cylindrical shape and which is disposed on the base 1 such that a predetermined gap 16 is formed between the stator 15 and the rotor 10.

The permanent magnetic rotor 10 is composed of a synthetic resin mold 11 and a plurality of permanent magnets 12a, 12b, 12c, and 12d. The synthetic resin mold 11 is fixedly disposed on the central portion of the rotary shaft 6, and each end surface thereof has a wheel-like shape. The permanent magnets 12a, 12b, 12c, and 12d are circumferentially arranged within an outer tubular portion 11a of the synthetic resin mold 11. The synthetic mold 11 is further composed of an outer tubular portion 11a, an inner tubular fixing portion 11b through which the rotary shaft 6 penetrates, and the connection portions 11c radially connect the inner tubular fixing portion 11b and the outer tubular portion 11a.

Concerning with the above-mentioned structure, when the drive motor is started through use of a power supply, the rotary shaft 6 rotates together with the output shaft 5a. The rotary shaft 6 smoothly rotates while being supported by the depression 3 of the bearing 2 in a point contact manner, since the synthetic resin mold 11 of the rotor 10 rotates together with the rotary shaft 6. As a result, magnetic field of the permanent magnetic rotor 10 crosses the stator windings 19 or the stator 15, so that an induction voltage is generated. Thus electricity can be taken out from the stator windings 19. Therefore, the permanent magnetic generator can efficiently generate electricity in amount.

The permanent magnetic generator of the present invention is a reformed generator to the above-mentioned invention to efficiently generate electricity in a still more amount.

DISCLOSURE OF THE INVENTION

The present invention (the invention described in claim 1) provides a permanent magnetic generator which comprises a base 21, a stator member 35, a drive-motor support 50, a rotoary shaft 55, a rotor 60, a second magnetic body 56, a bearing member 80, and a drive motor 70. The stator member 35 is horizontally disposed above the base 21 through support members 27 and has a stator support 36. The drive-motor support 50 is horizontally disposed and fixed to the support members 27 such that a space 61 is formed above the stator member 35. The rotary shaft 55 penetrtes a first center hole 42 formed in the stator support 36 and a second center hole 51 formed in the drive-motor support 50 and is supported by means of bearing 43 and 52. The rotor 60 is fixed to the rotary shaft 55 to be located within the space 61 and has annular permanent magnets 65 that face stator windings 38 of the stator member 35. The second magnetic body 56 is fixedly attached to the projected lower end 55a of the rotary shaft 55 such that the second magnetic body 56 floats due to a repulsive force generated between the first and second magnetic bodies 23 and 56. The bearing member 80 is attached to the drive-motor support 50 in order to support the rotary shaft 55 urged upward through the second magnetic body 56. The drive motor 70 is fixed to the drive-motor support 50 and is adapted to rotate the rotary shaft 55 through power transmission means 74 and 75. Therefore, the rotary shaft can be improved to the performance for its rotation.

The present invention (the invention described in claim 5) provides a permanent magnetic generator including a rotor 60 which further comprises: a rotary plate 62, annular steel plates 64, and annular permanent magnets 65. The rotary plate 62 is horizontally disposed and fixed to the rotary shaft 55. The annular steel plates 64 are integrally fixed to the lower surface of the rotary plate 62 such that they are opposed to conductor attachment blocks 37 of the stator member 35. The annular permanent magnets 65 are integrally fixed to the lower surface of the rotary plate 62 such that the annular steel plates 64 and the annular permanent magnets 65 are alternately arranged and are opposed to stator windings 38 of the conductor attachment blocks 37 in a non-contacting state. Therefore, a strong magnetic field can be generated within the space 61, and the rotary shaft can be improved to the performance for its rotation.

The present invention (the invention described in claim 6) provides a permanent magnetic generator which comprises a first magnetic body 23 fixedly provided on a base 21, a stator member 35, a drive-motor support 50B, a rotary shaft 55B, a rotor 60, a second magnetic body 56B, and a drive motor 70B. The stator member 35 is horizontally disposed above the base 21 through support members 27 and has a stator support 36. The drive-motor support 50 is horizontally disposed and fixed to the support members 27 such that a space 61 is formed above the stator member 35. The rotary shaft 55B penetrtes a first center hole 42 formed in the stator support 36 and a second center hole 51 formed in the drive-motor support 50 and is supported by means of bearing 43 and 52. The rotor 60 is fixed to the rotary shaft 55B to be located within the space 61 and has annular permanent magnets 65 that face stator windings 38 of the stator member 35. The second magnetic body 56B is fixedly attached to the projected lower end 55a of the rotary shaft 55B such that the second magnetic body 56B floats due to a repulsive force generated between the first and second magnetic bodies 23 and 56. The drive motor 70B is vertically disposed on the upper surface of the drive-motor support 50B at the center portion thereof through a drive-motor support blocks 71B. The drive shaft 72B of the drive motor 70B is coaxial with and connected to the projected tip end of the rotary shaft 55B, which is urged upward through the second magnetic body. Therefore, the same effect as that of the invention described in claim 1 can be achieved.

BRIEF DESCRIPTION OF THE DRAWING

FIG. 1 is a perspective explanatory view showing a first embodiment of the present invention;

FIG. 2 is an explanation view from the top-view direction in FIG. 1;

FIG. 3 is an explanation view from the front-view direction in FIG. 1;

FIG. 4 is an expanded schematic explanation view taken vertically on line 4—4 in FIG. 2;

FIG. 5 is mainly expanded explanation view in FIG. 4;

FIG. 6 is a reduced schematic explanation view indicating from the line 6—6 in FIG. 3;

FIG. 7 is an exploded perspective view;

FIG. 8 is a mainly schematic explanation view;

FIG. 9 is an schematic explanation view showing a variation of main part in FIG. 8;

FIG. 10 is an schematic explanation view showing a variation of main part in FIG. 4;

FIG. 11 is a schematic cross-sectional explanation view showing a second embodiment.

BEST MODE FOR CARRYING OUT THE INVENTION

Figure 1:
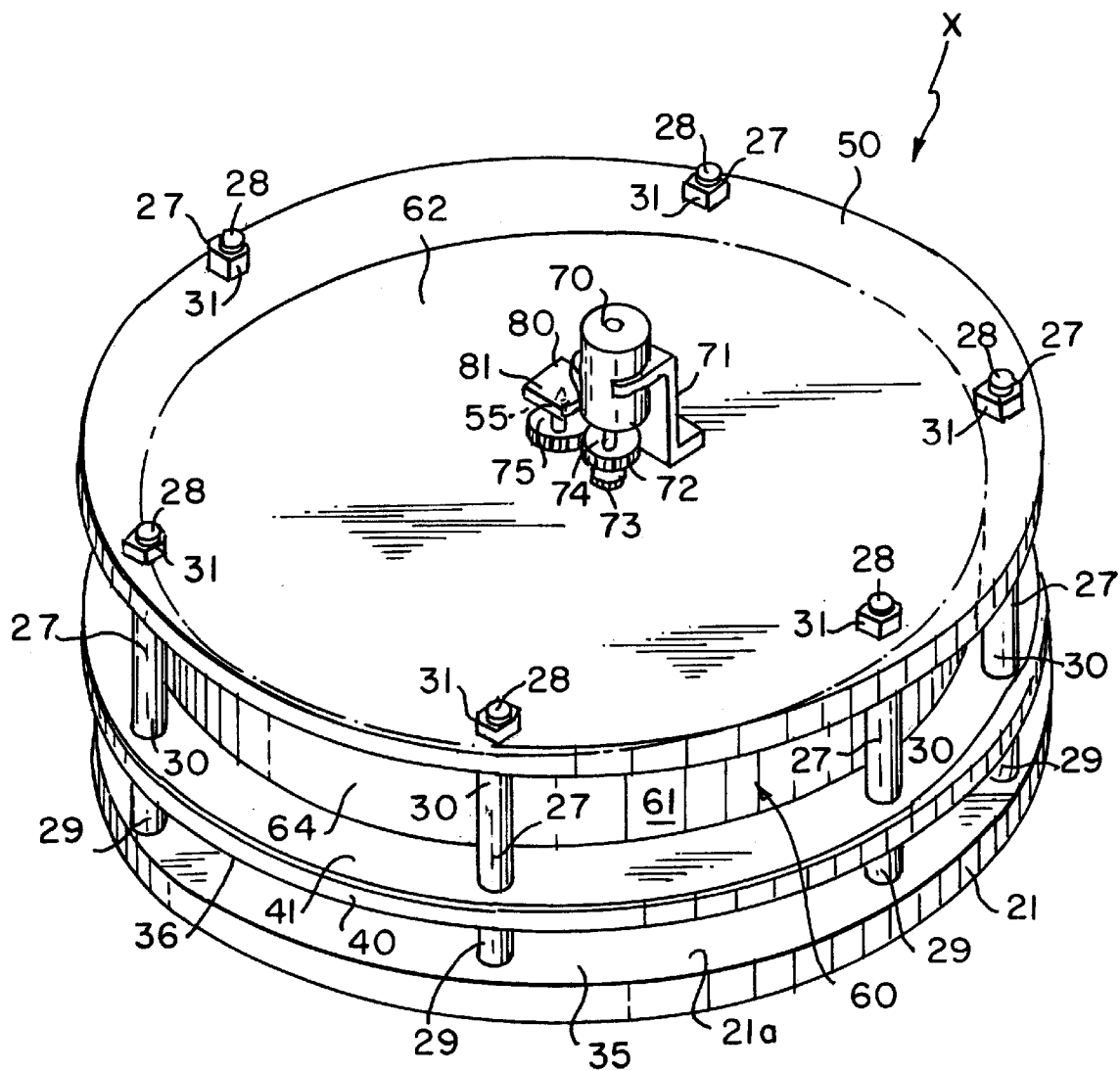
FIGS. 1 to 8 illustrate in each explanation view showing a first embodiment of the present invention.
Figure 2:
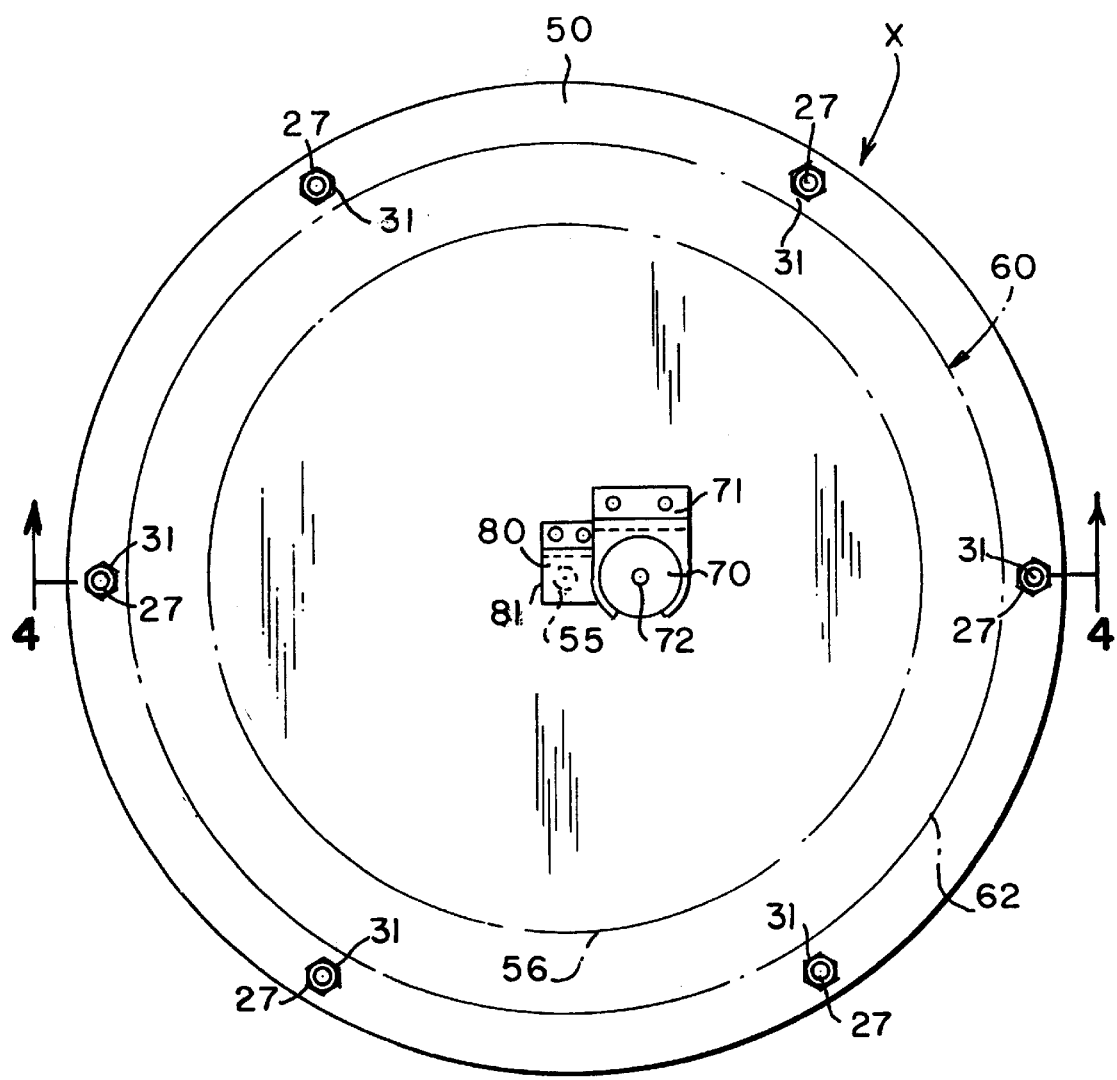
Figure 3:
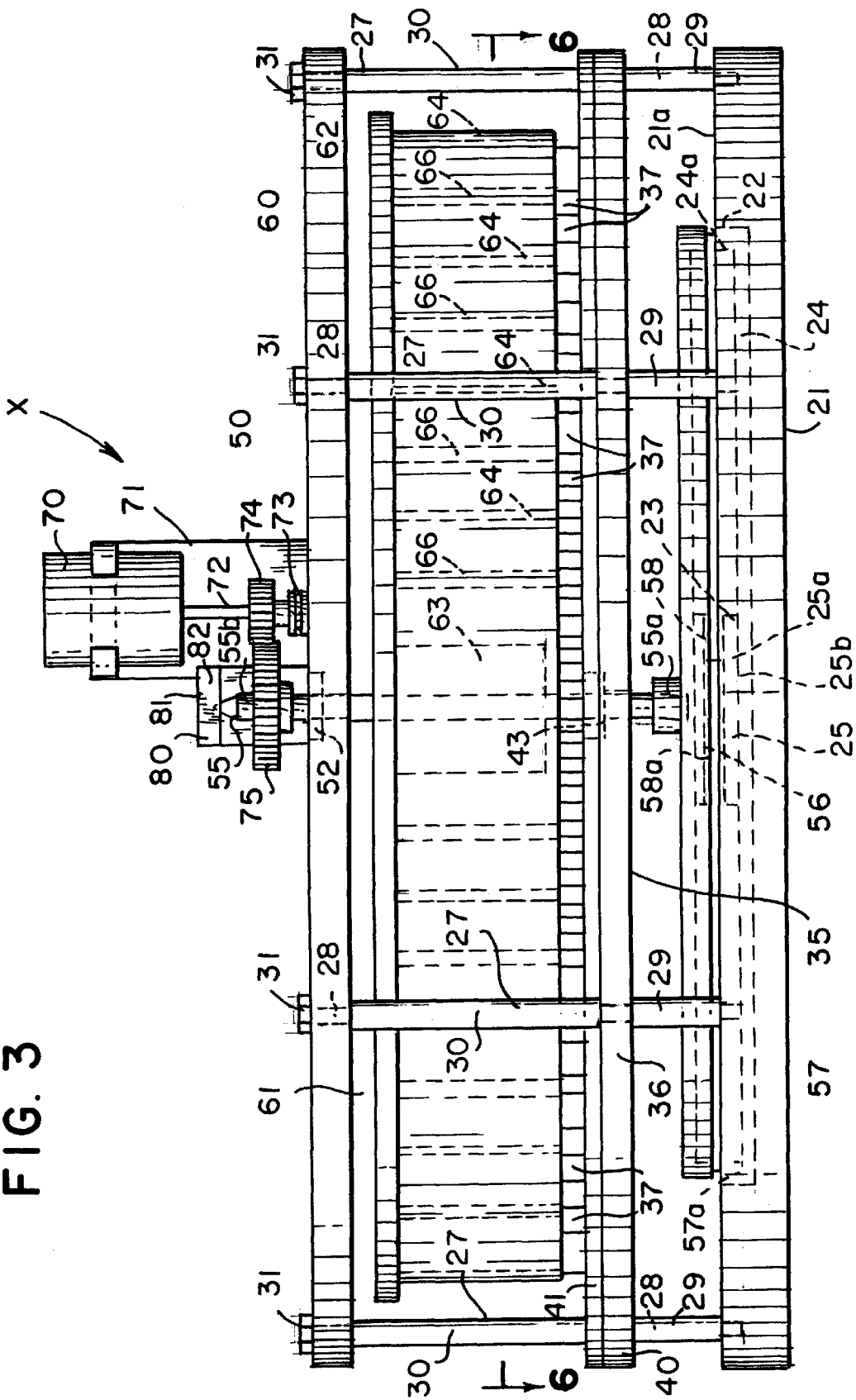
Figure 4:
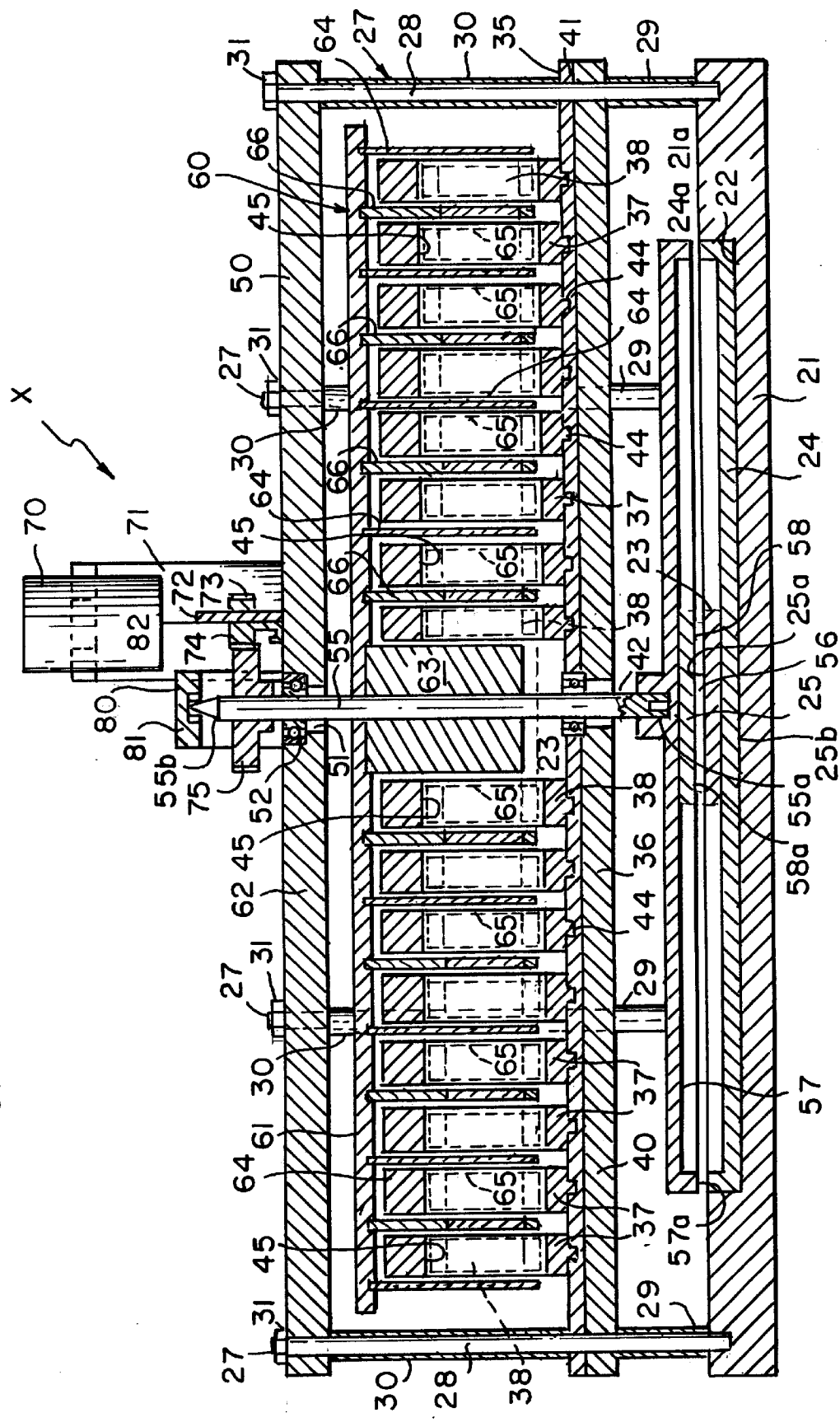
Figure 5:
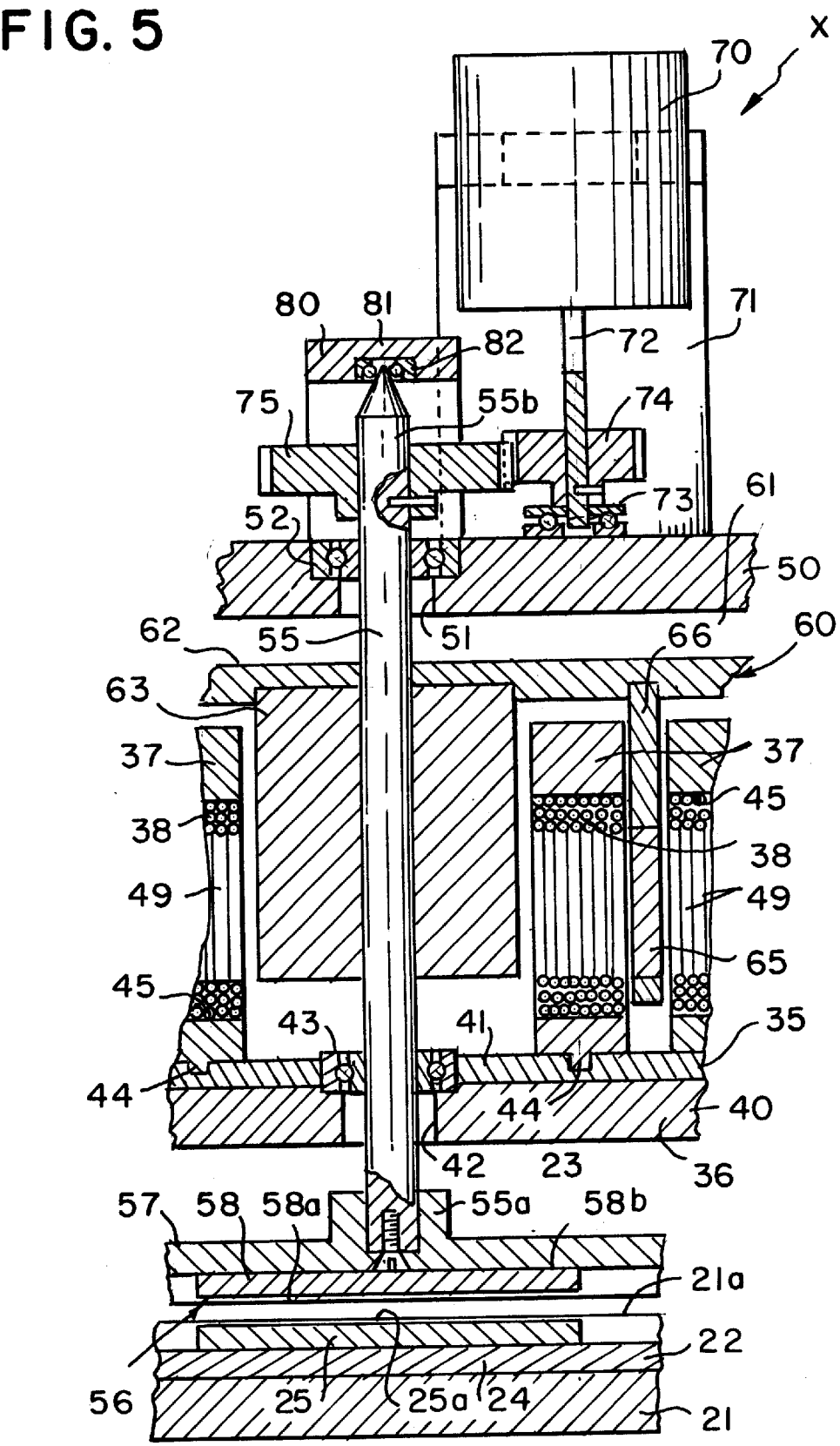

Preferred embodiment of the present invention are described in more detail below referring to the accompany-ing drawings. FIGS. 1 to 9 illustrate a first embodiment of a permanent magnetic generator X. Numeral 21 denotes a circular base. A circular depression 22 is formed over a large area on the upper surface 21a of the base 21. Numeral 23 denotes a first magnetic body fixedly provided in the depression 22. The first magnetic body 23 is composed of a stationary yoke 24 formed of iron and having a concave cross section fitted to the depression 22, and a flat magnet 25 fixed to the center portion of the bottom surface of the stationary yoke 24.

The upper surface 21a of the base 21, the upper surface 24a of the circumferential edge portion of the stationary yoke 24, and the upper surface 25a of the magnet 25 are located on a circumferentially common plane.

In this embodiment, the magnet 25 has a south pole on the side of the upper surface 25a and a north pole on the side of the lower surface 25b. Accordingly, due to the effect of the polarity (north pole) of the magnet 25, a north pole is formed in the vicinity of the upper surface 24a of the circumferential edge portion of the stationary yoke 24 having a function for generating magnetism.

Numeral 27 denotes each of a plurality of support members which are vertically disposed on the base 21. In the present embodiment, six support members 27 are provided along the circumferential edge of the base 21 at predetermined intervals.

The structure of one of the support members 27 will now be described. Numeral 28 denotes a support shaft having an external thread at either end. The support shaft 28 is fixedly screwed into a tapped hole formed at the circumferential edge of the base 21. Numeral 29 denotes a lower support pipe which is fitted onto a lower portion of the support shaft 28. Numeral 30 denotes an upper support pipe which is fitted onto an upper portion of the support shaft 28 such that the stator member 35 is interposed between the lower and upper support pipes 29 and 30. Numeral 31 denotes a lock nut which is in screw engagement with the projected upper end of the support shaft 28 in order to fix the drive-motor support to the upper support pipe 30.

The upper support pipe 30 has a length approximately double that of the lower support pipe 29, and the support shaft 28 penetrates the support pipes 29 and 30.

Next, a stator member 35 is described. The stator member 35 is mainly composed of a circular, nonmagnetic stator support 36, a plurality of (lots of) nonmagnetic conductor attachment blocks 37, and a plurality of stator windings 38. The stator support 36 is fixedly supported by means of the support members 27. The conductor attachment blocks 37 are radially and circumferentially disposed on the upper surface of the stator support 36 such that a predetermined space is formed between adjacent attachment blocks 37. The stator windings 38 (one generating coil on the whole) are fixedly provided in the conductor attachment blocks 37. In relation to the object of the present invention of cogging phenomenon, the term "diamagnetic material" used herein means feeble magnetic substance (substain contains little magnetic substance) and material which is lighter than ion, regardless of whether the substance is nonferrous metal (such as titanium, stainless, or the like) or a nonmetal (such as synthetic resin, ceramics, cloth, or paper).

The nonmagnetic stator support 36 in this embodiment is composed of a lower support 40 formed of wood and horizontally disposed to face the upper surface 21a of the base 21, and an upper support 41 formed of synthetic resin and integrally fixed to the upper surface of the lower support 40. The supports 40 and 41 are supported by mean of the support shafts 28 to be located on the upper ends of the lower support pipes 29 of the support members 27. A through-hole serving as a first center hole 42 is formed in the stator support 36. A first ball bearing 43 is provided within the first center hole 42 at a stepped portion thereof. Further, a large number of engagement grooves 44 for receiving the conductor attachment blocks are formed radially and circumferentially on the upper surface of the upper support 41 at predetermined intervals.

Figure 8:
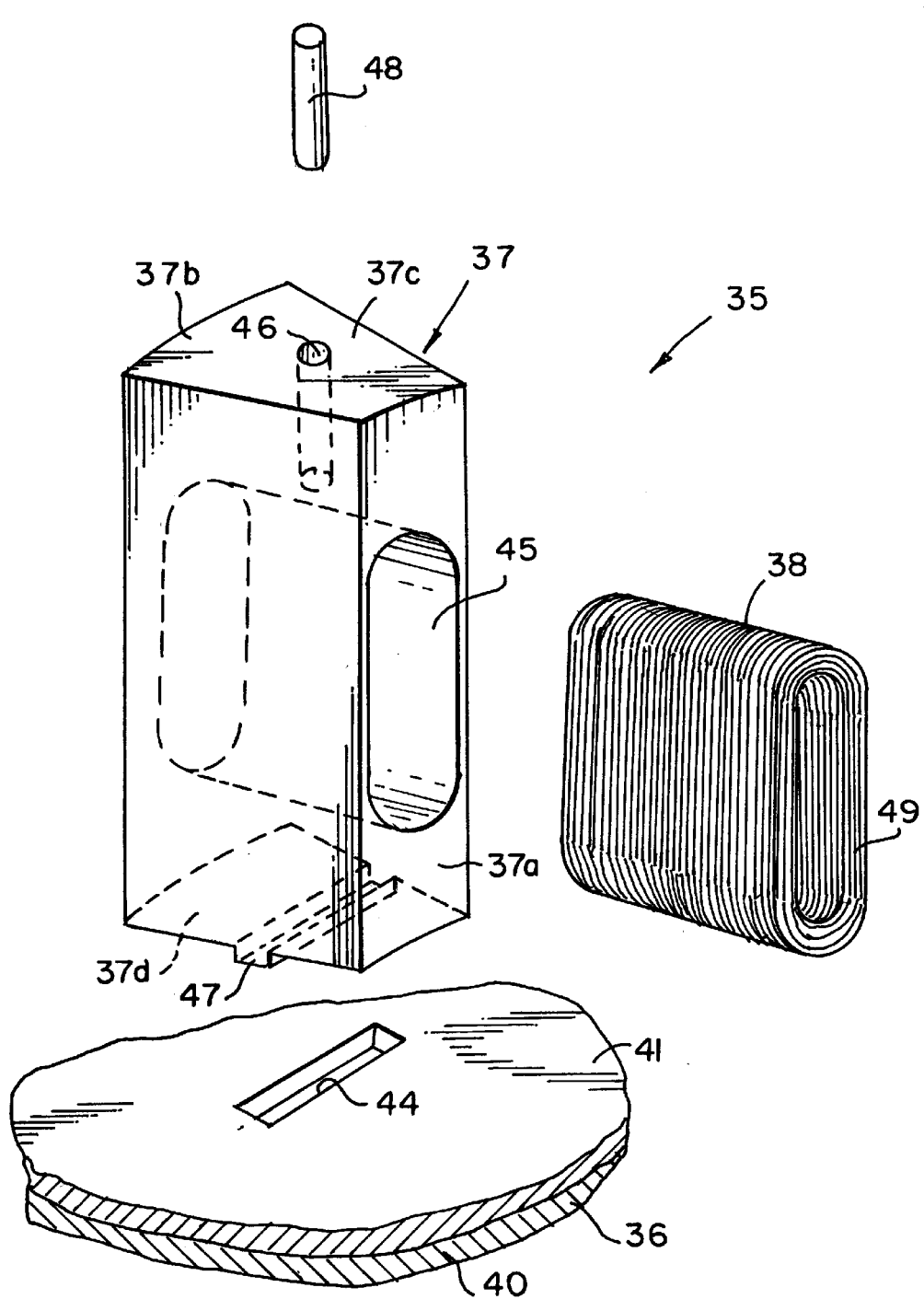

Each of the nonmagnetic conductor attachment blocks 37 in this embodiment generally has a shape of a vertically elongated block having trapezoidal or fan-shaped upper and lower end surfaces. With reference to FIG. 8, the structure of one of the conductor attachment blocks 37 will be described. Numeral 45 denotes a vertical elongated hole that penetrates the conductor attachment blocks 37 in a redial direction (from front surface 37a to back surface 37b) with respect to a rotary shaft 55, which will be described later. The vertical elongated hole 45 is formed at an approximate center portion of the conductor attachment blocks 37. Numeral 46 denotes a through-hole which is formed from the trapezoidal upper surface 37c toward the vertical elongated hole 45. The through-hole 46 perpendicularly intersects the vertical elongated hole 45 to communicate therewith. Numeral 47 denotes an engagement portion which is projected from the trapezoidal lower surface 37d of the conductor attachment blocks 37 and is engaged with the engagement grooves 44 of the upper support 41.

Each of the stator windings 38 is shaped in a form of an elongated tubular body (bobbinless coil) having a track-shaped opposite ends. In the present embodiments, the stator windings 38 is inserted into the above-mentioned vertical elongated hole 45, and fixed by means of a fixing pin 48 inserted into the through-hole 46. Accordingly, the stator winding 38 has a cavity portion 49 which penetrates the stator winding 38. Furthermore, the conductor attachment blocks 37 is made synthetic resin to reduce its weight.

Numeral 50 denotes a drive-motor support that is horizontally disposed and fixed to the upper ends of the support members 27. The drive-motor support 50 is supported by means of the support shafts 28 to be located on the upper ends of the upper support pipes 30 of the support members 27 and is fixed by means of lock nuts 31 that are in screw engagement with the support shafts 28. As in the stator support 36, a through-hole serving as a second center hole 51 is formed in the drive-motor support 50. A second ball bearing 52 is provided within the second center hole 51 at a stepped portion thereof. The drive-motor support 50 is also made of wood or synthetic resin to reduced its weight.

Numeral 55 denotes a rotary shaft journaled by means of the first ball bearing 43 of the stator support 36 and the second ball bearing 52 of the drive-motor support 50. A lower end portion 55a of the rotary shaft 55 penetrates the first center hole 42 of the stator support 36 and projects to the vicinity of the magnet 25 of the first magnetic bodt 23. Meanwhile, an upper end portion of the rotary shaft 55 penetrates the second center hole 51 of the drive-motor support 50. The projected tip endportion of the rotary shaft 55 is sharpened into a conical shape.

At the projected lower end portion 55a of the rotary shaft 55 is fixedly attached a second magnetic body 56 which floats due to repulsive force generated between the first and second magnetic bodies 23 and 56. Similarly to the case of the first magnetic body 23, the second magnetic body 56 is composed of a floating yoke 57 formed of iron and having an inverted concave cross section, and a flat floating magnet 58 fixed to the center portion of the inner wall of the floating yoke 57. The bottom surface 57a of the circumferential edge portion of the floating yoke 57 and the lower surface 58a of the floating magnet 58 are located on a substantially common plane. In the present embodiment, the floating magnet 58 has a south pole on the side of the lower surface 58a and a north pole on the side of the upper surface 58b. Accordingly, due to the effect of the polarity (north pole) of the floating magnet 58, a north pole is formed in the vicinity of the lower surface 57a of the circumferential edge portion of the floating yoke 57. Therefore, the rotary shaft 55 is always urged upward through the second magnetic body 56, which repulses against the first magnetic body 23.

Numeral 60 denotes a rotor formed of iron. The rotor 60 is fixed to the rotary shaft 55 to be located within a space provided between the stator support 36 of the stator member 35 and the drive-motor support 50.

The stator 60 in the present embodiment is composed of a horizontal rotary plate 62, a sleeve 63, a plurality of (four plates in all) annular steel plates 64, and annular permanent magnets 65. The rotary plate 62 is fixed to the rotary shaft 55 at a portion near the upper end of the rotary shaft 55. The sleeve 63 is fixedly attached on the lower surface of the rotary plate 62 at the center thereof and fitted onto the rotary shaft 55. The annular steel plates 64 are integrally attached to the lower surface of the rotary plate 62 such that the steel plate 64 are nested (concentric circle) around the sleeve 63 and that a predetermined space is formed between adjacent two steel plates 64 in order to receive two conductor attachment blocks 37 therebetween. The permanent magnets 65 are integrally attached to the lower surface of the rotary plate 62 such that the annular steel plates 64 and the annular permanent magnets 65 alternately face the stator windings 38 of the conductor attachment blocks 37 in a non-contacting state.

Figure 6:
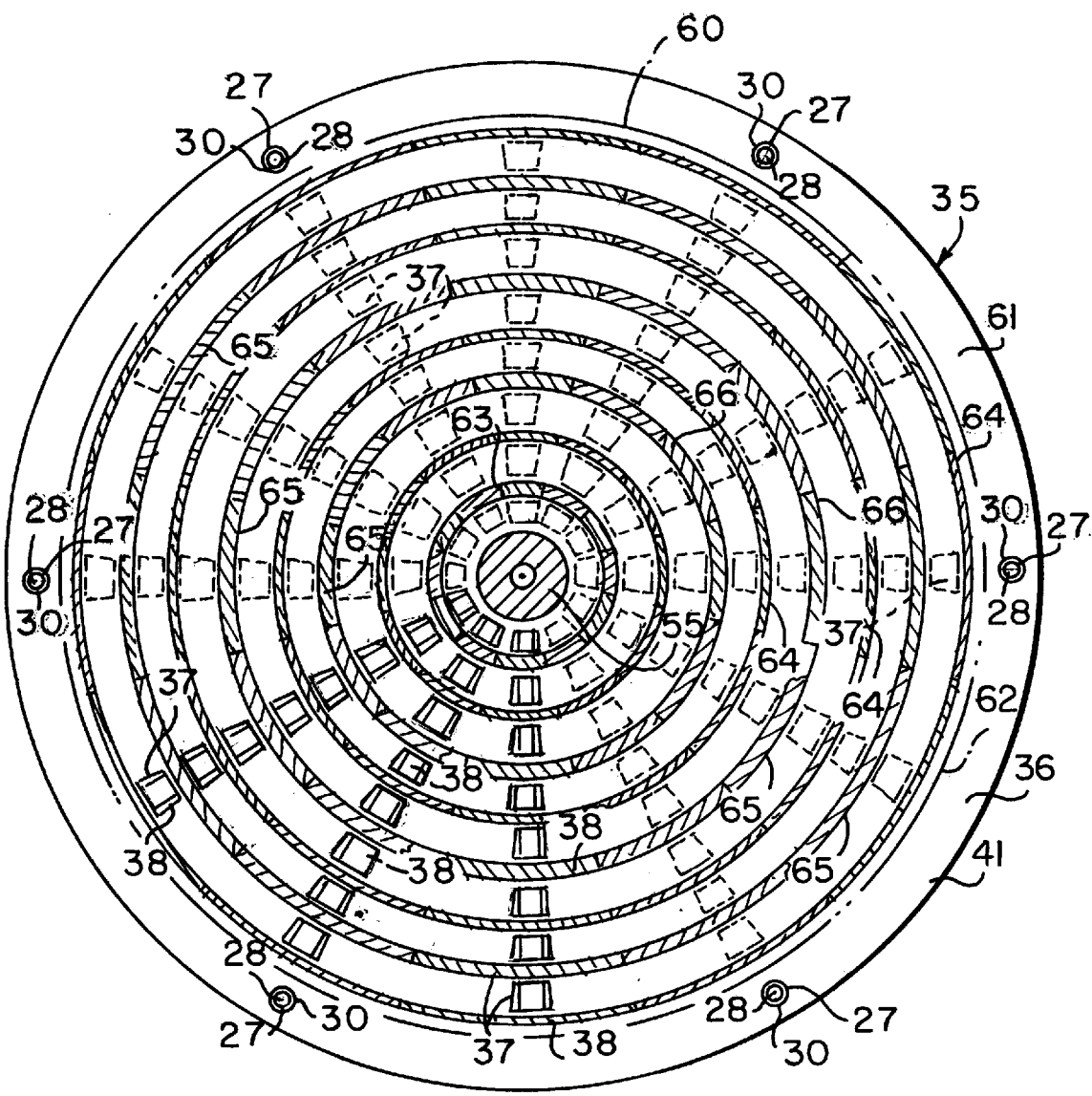
Figure 7:
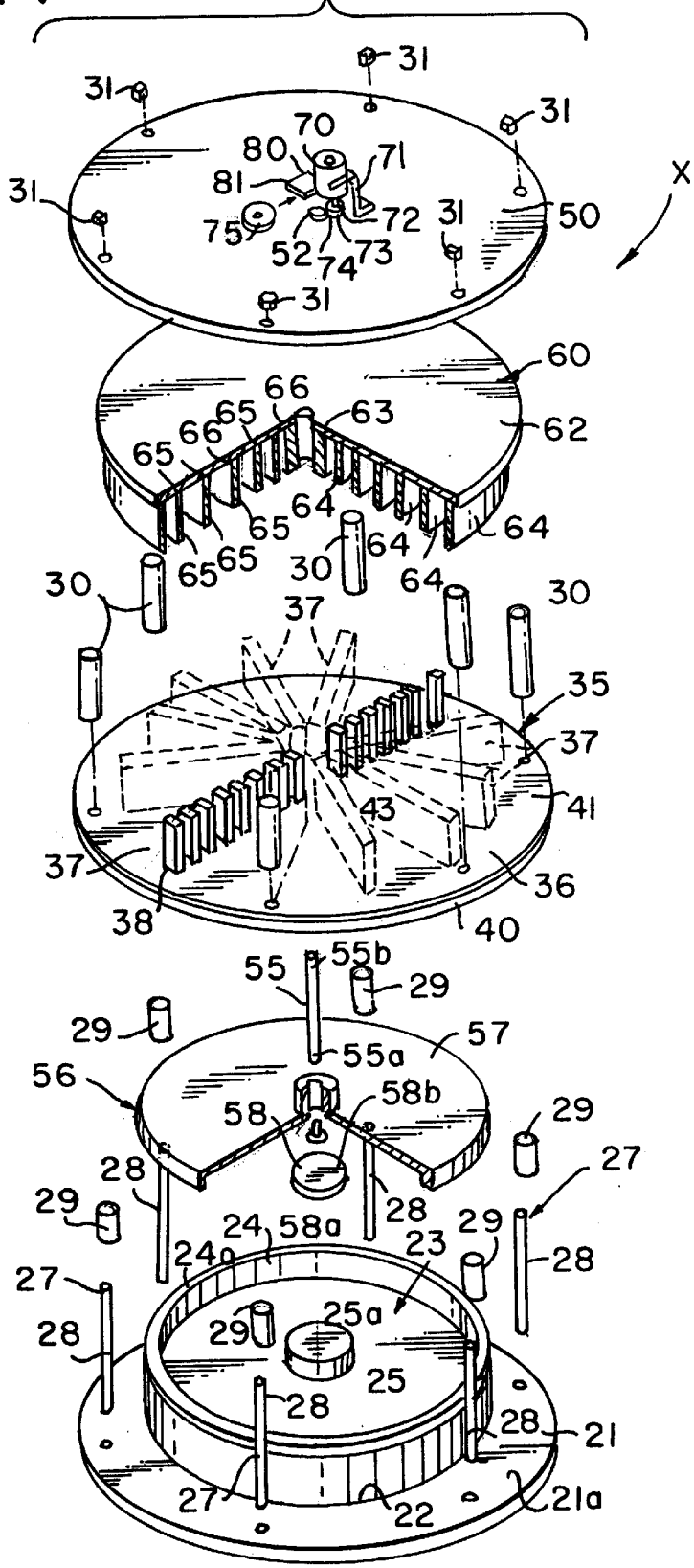

That is, as illustrated in FIGS. 6 and 7, in space formed between the conductor attachment blocks 37, which are radially disposed on the stator support 36 and accommodate the stator windings 38 in the vertical elongated hole 45, the plurality of annular permanent magnets 65 and the plurality of annular plates 64 are alternately enter such that the annular permanent magnet 65 first enters the first space, the annular steel plates 64 then enter the second space, the annular permanent magnet 65 then enters the third space, the annular steel plates 64 then enter the fourth space, etc. Therefore, at least one conductor attachment blocks 37 is sandwiched between the annular permanent magnet 65 and the annular steel plate 64 in a non-contacting state.

The sleeve 63 has a large thickness or diameter in order to increase the mass of the rotor 60 to thereby obtain a so-called flywheel effect, as well as to prevent vibration and deflection of the rotor 60. Each of the annular permanent magnets 65 concentrically disposed on the lower surface on the rotary plate 62 is composed of a plurality of curved permanent magnet plates (not indicated by reference numerals) that are combined such that north and south poles are alternately formed in the circumferential direction (such that the north and south poles are alternately formed on both the inner surface side and the outer surface side of the permanent magnet plates). In the present embodiment, the annular permanent magnets 65 are fixedly fitted into the fitting windows of annular attachment walls 66 formed of iron and concentrically and integrally attached to the lower surface of the rotary plate 62.

Numeral 70 denotes a drive motor fixedly disposed above the drive-motor support 50 through a drive-motor support bracket 71. This drive motor is started through use of a power supply, not illustrate, such as a battery, a condenser, a home power supply, or the like. In the present embodiment, the drive motor 70 is not coaxial with the rotary shaft 55, but is disposed in the vicinity of the rotary shaft 55 such that the drive shaft 72 of the drive motor 70 is directed downward.

A lower end portion of the drive shaft 72 is journaled by means of a third ball bearing 73 provided on the upper surface of the drive-motor support 50. Further, a drive gear 74 is fixedly provided on the drive shaft 72 at a portion near the lower end thereof. The drive gear 74 is in meshing engagement with a driven gear 75 fixed to the projected upper end of the rotary shaft 55.

Numeral 80 denotes a bearing member attached to the central portion of the upper surface of the drive-motor support 50 in order to support the projected tip end of the rotary shaft 55. The bearing member 80 is composed of a bearing block 81 having an angle-like shape or a frame-like shape and a fourth ball bearing 82 which is provided on the inner wall surface of the upper horizontal wall of the bearing block 81 and supports the shaped tip end of the rotary shaft 55.

In the above-mentioned structure, When the drive motor 70 is started through use of a power supply of a condenser, for example, a power accumulation apparatus, drive force of the drive gear 74 of the drive shaft 72 is transmitted to the driven shaft 75, so that the rotary shaft 55 rotates. At this time, since the second magnetic body 56 repulses against the first magnetic body 23 due to a repulsive force produced therebetween, the rotary shaft 55 rotates in a floated state while being supported by the first ball bearing 43, the second ball bearing 52, and the fourth ball bearing 82. Therefore, the weight of the rotor 60 does not act on the ball bearings 43, 52, and 82. The first and second ball bearings 43 and 52 bear only a tangential friction force in the circumferential direction of the rotary shaft 55. Further, the fourth bearing 82 bears only a friction force generated due to upward abutting motion of the sharpened tip end of the rotary shaft 50. Therefore, as compared with ordinary machines and devices, the rotary shaft 50 rotates smoothly in a state in which the friction resistance with the bearing member is decreased.

When the rotary shaft 55 rotates, magnetic field of each annular steel plate 64 of the rotor 60 and each annular permanent magnet 65 crosses the stator windings 38 of each conductor attachment block 37 of the stator member 35, so that an induction voltage is generated, and thus electricity can be taken out from the stator winding 38. In the result of the experiment, the permanent magnetic generator X succeeded in generating efficiently electricity in amount.

By the way, in the permanent magnetic generator X of the first embodiment, the stator support 36 of the stator member 35 is composed of a lower support 40 formed of wood and the upper support 41 formed of synthetic resin, however, the lower and upper supports 40 and 41 may be formed integrally through use of a synthetic resin material or a ceramic material.

In addition, the stator support 36 of the stator member 35 and the conductor attachment blocks 37 may be formed integrally through use of a synthetic resin material or a ceramic material. Also the tip end portion of the rotary shaft 60 is sharply pointed as in the case of a nail, however, the bearing 82 supports to the tip end thereof may be formed in an inverted-conical depression 3.

Figure 9:
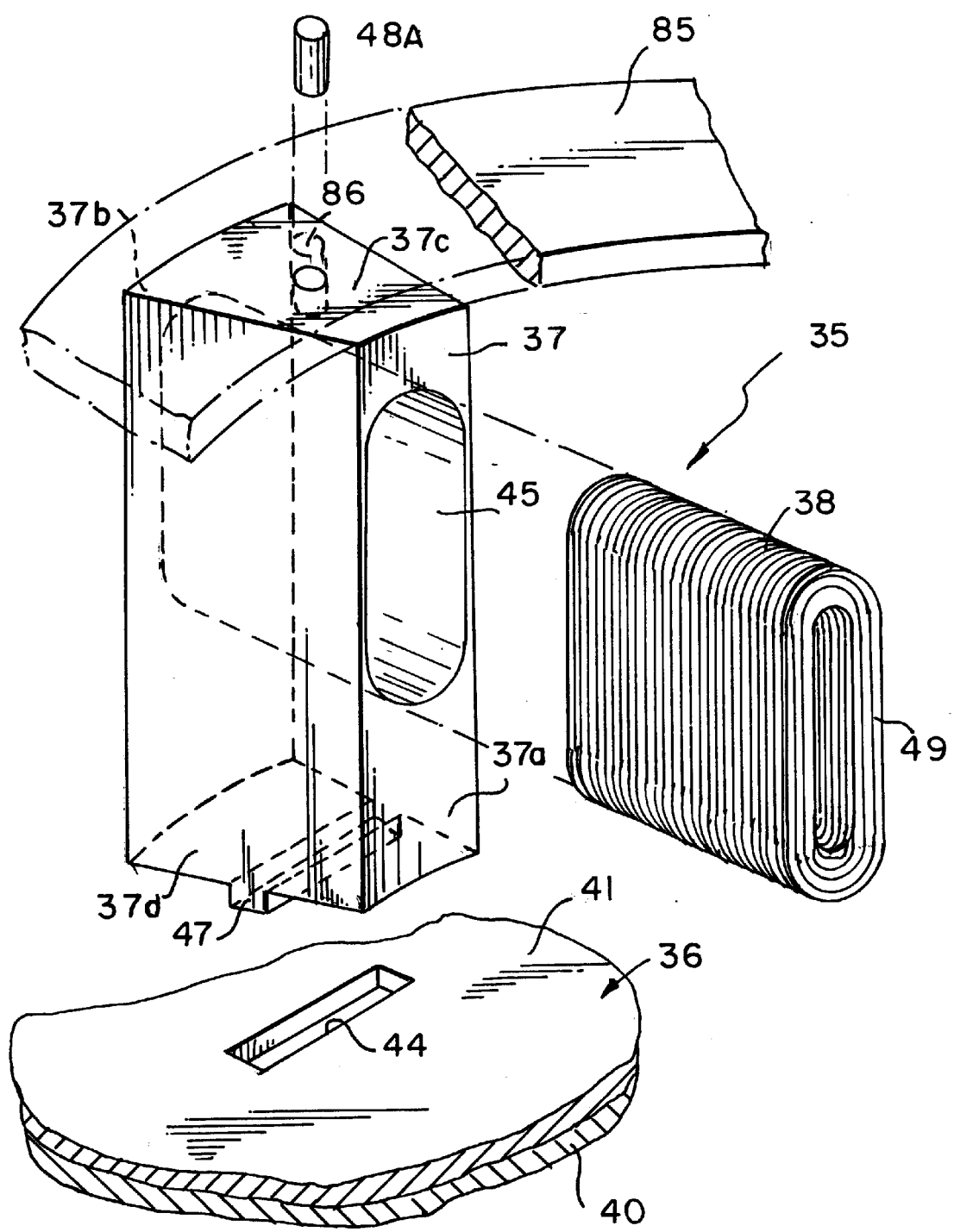
FIG. 9 and FIG. 10 illustrate in each schematic explanation view showing a variation of main part of the first embodiment of the present invention.

Further, as illustrated in FIG. 9, the plurality of conductor attachment blocks 37 disposed on the upper surface of the stator support 36 of the stator member 35 at predetermined intervals in the circumferential direction may be integrally connected through an annular fixing plate 85. In this case, the annular fixing plate 85 is fixed to the upper surfaces 37c of the conductor attachment blocks 37 disposed in the circumferential direction by means of fixing pins 48A nserted into attachment through-holes 86 formed at predetermined intervals.

Figure 10:
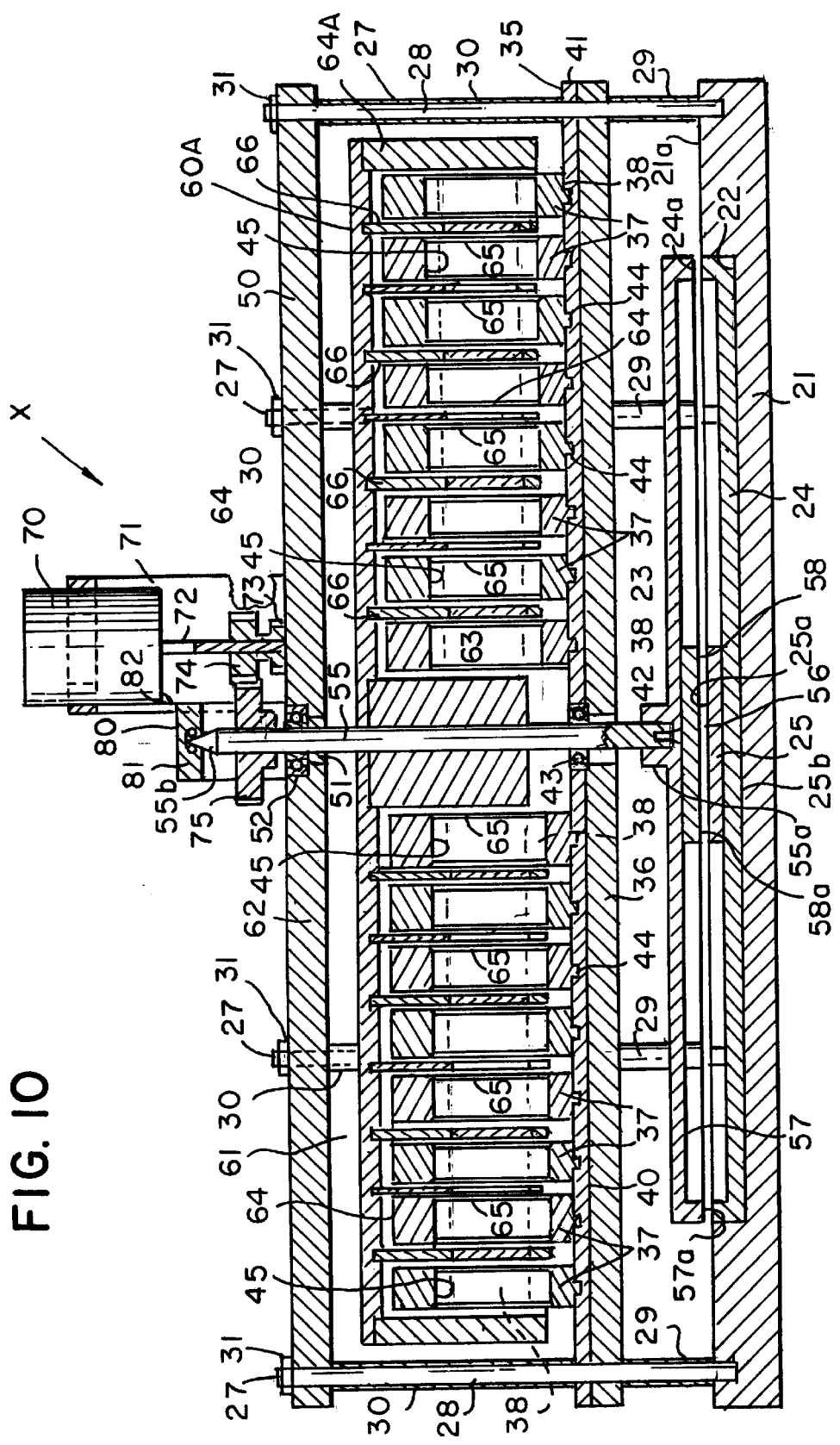

Furthermore, as illustrated in FIG. 10, at least one of the annular steel plates 64 of the rotor 60A may be formed to have a wall thickness greater than that of other annular steel plates 64 to produce an effect of flywheel therein. In the embodiment of FIG. 10, an outermost annular steel plate 64A has a slightly larger wall thickness to obtain a sufficient inertia moment and flywheel effect.

Therefore, the rotor 60A gets a large inertia force so that the resistance by counter electromotive force, when electricity is generated, is controlled by inertial moment and flywheel effect due to the rotor 60A even if the drive motor 70 stops.

Additionaly, the permanent magnet 65 of the rotor 60 (60A) is a neodymium magnet, for example having BHmax of 41.1 MGO.

OTHER EMBODIMENT

Other embodiments of the preset invention will now be described. Throughout the drawings of the embodiments, like components are denoted by like numerals as of the first embodiment and will not therefore be explained in greater detail. In addition, in each embodiment.

Figure 11:
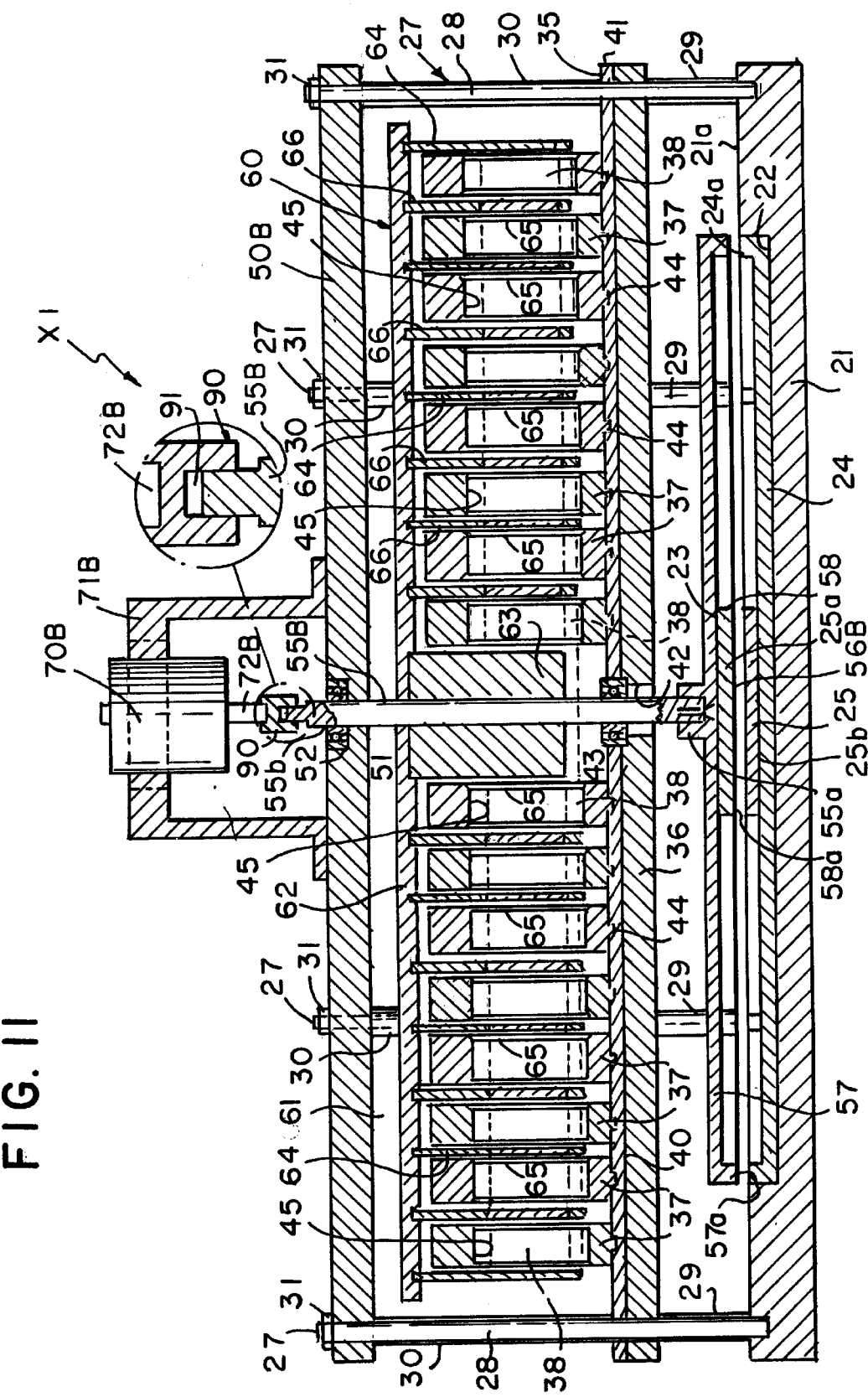
FIG. 11 illustrates in a schematic cross-sectional explanation view showing a second embodi-ment of the present invention.
Figure 12:
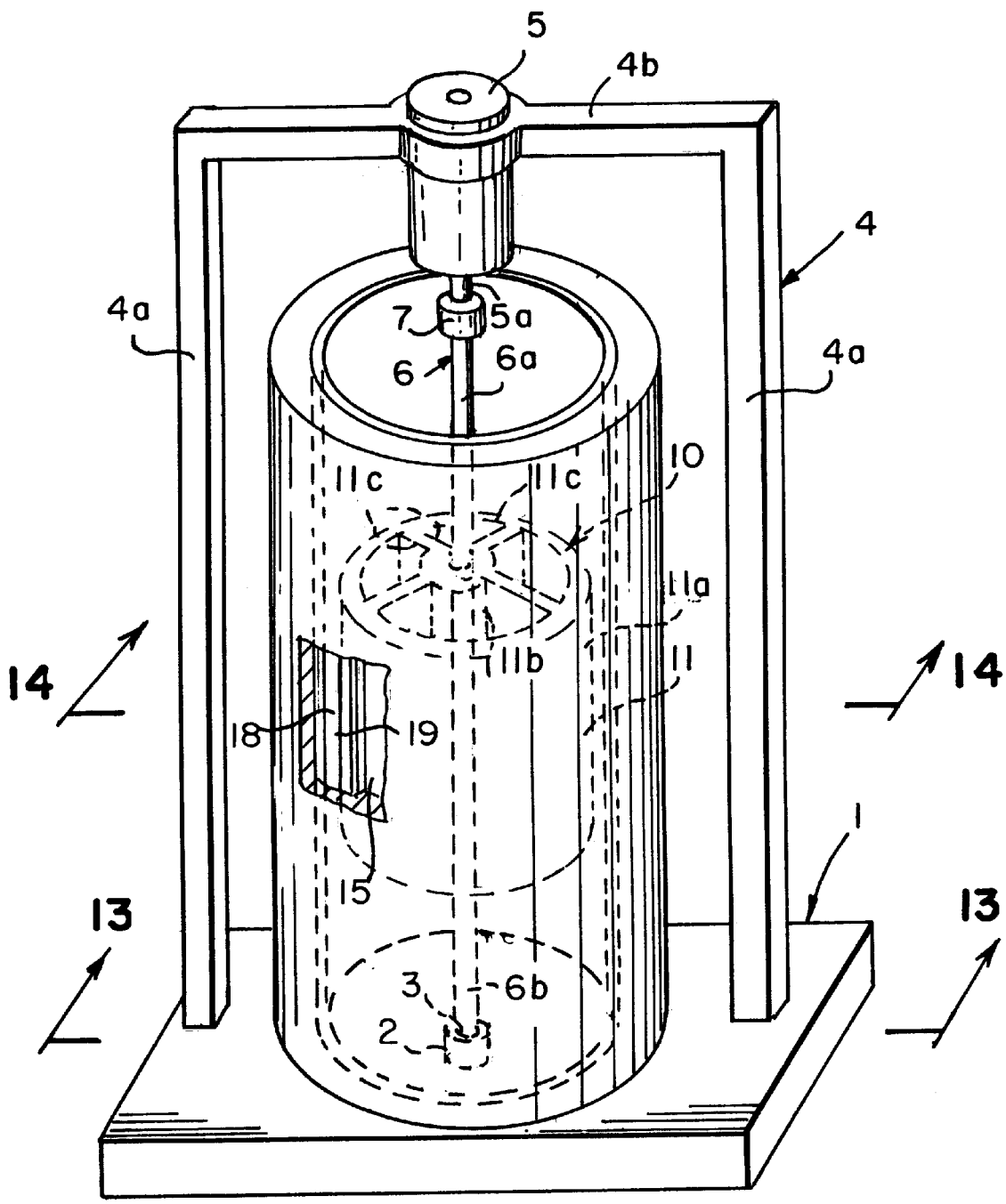
FIGS. 12 to 14 illustrate in each schematic explanation view showing an example of a prior art which is proposed by the present invention.
Figure 13:
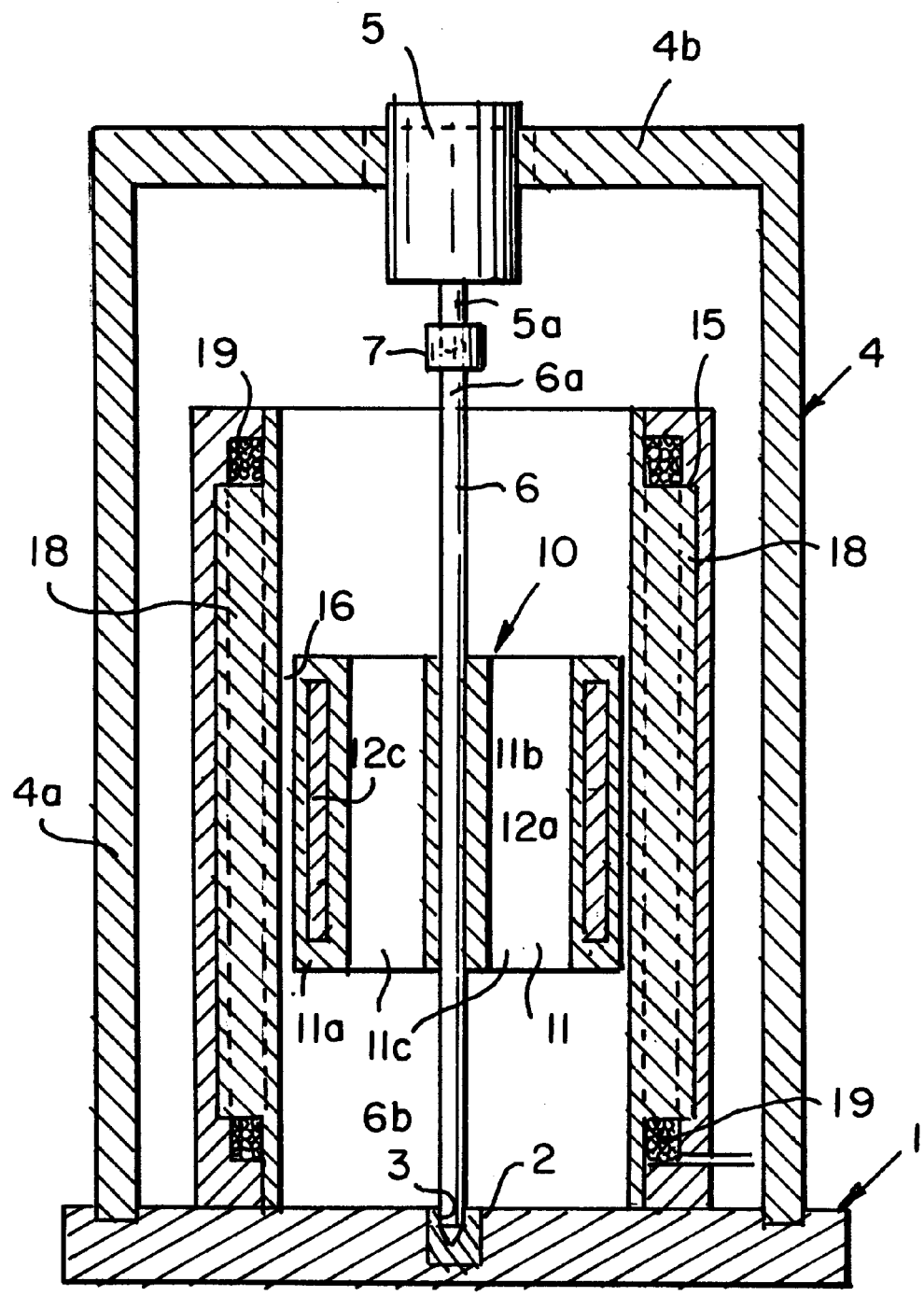
Figure 14:
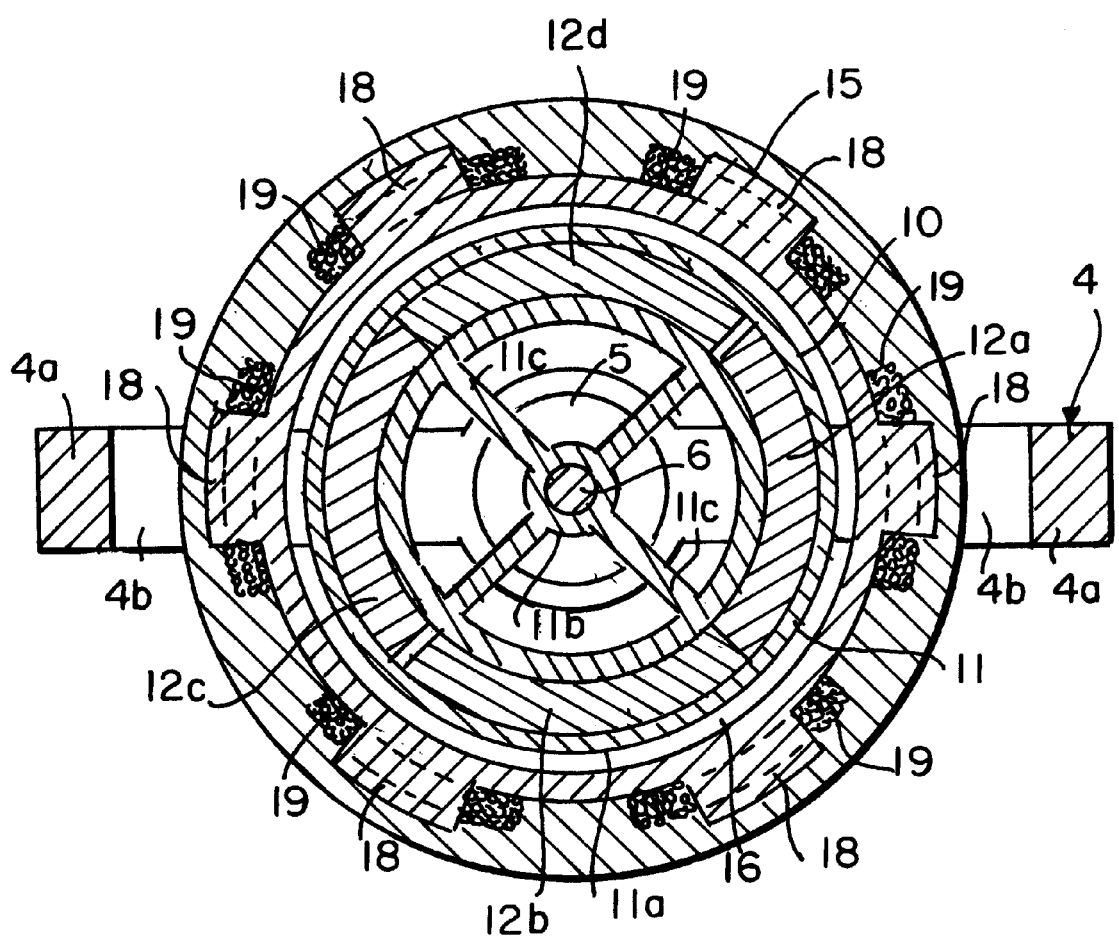

FIG. 11 illustartes a second embodiment of the present invention; this is distinguished from the first embodiment in that a drive motor 70B is vertically disposed on the upper surface of the drive-motor support 50B at the center portion thereof through a drive-motor support blocks 71B, having a drive shaft 72B of the drive motor 70B which is coaxial with and connected to the projected tip end of the rotary shaft 55B, which is urged upward through the second magnetic body.

Then, the coupling 90 having a fitting hole 91 formed in the shape of a square to a downward direction is attached fixedly to a projected end portion of the drive shaft 72B of the drive motor 70B. Therefore, the projected upper end portion, formed in a square shape, of the rotary shaft 55B which rises due to the repelling power with the second magnetic body 56B is always inserting into the fitting hole 91 of the coupling 90.

INDUSTRIAL APPLICABILITY

In the above-mentioned permanent magnetic generator of the present invention, the second magnetic body integrally provided to the rotary shaft rise up corresponding to the nature of poles of the first magnetic body adjasent the base so that the frictional resistance of rotary shaft to the bearing reduces it to a minimum.

Also, because the rotor of the permanent magnetic generator has a large diameter and enough mass (weight), and it gets a large inertia moment, the resistance by a counter electromotive force is controlled by inertial moment and flywheel effect due to the permanent magnetic rotor, then, the permanent magnetic generator rotates and continues to generate even if there is not power source for driving for a limited time.

Moreover, there are some effectives, for example, it is possible to manufacture of low cost relatively, it does not cost much money for a running cost, the size of the permanent magnetic generator can be reduced, or the like.

Additionally, in such embodiment that the rotor have the anuular steel plate faces to the fixed winding of stator member, magnetic field produces into the space in more strong. Therefore, it can be improve to generate electricity in amount. Furthermore, in such embodiment that elongated fixed winding (bobbinless coil) is attached to the conductor fitting piece of the stator member, its weight can be reduced. In addition, in such embodiment that the stator member without the fixed winding is formed of nonmagnetic material a cogging phenomenon is slight.

Therefore, the present invetion is suitable for mounting to real property or movable property such as a building, a mountain hut, a ship, an automobile, or the like.

DESCRIPTION OF THE SYMBOLS

X, X1 . . . Permanent Magnetic Generator;
21 . . . Base;
23 . . . First Magnetic Body;
27 . . . Support Member;
35 . . . Stator Member;
36 . . . Stator Support;
37 . . . Conductor Attachment Block;
38 . . . Stator Winding;
42 . . . First Center Hole;
50 . . . Drive-Motor Support;
51 . . . Second Center Hole;
55, 55B . . . Rotary Shaft;
56, 56B . . . Second Magentic Body;
60, 60A . . . Rotor;
61 . . . Space;
64, 64A . . . Annular Steel Plate;
65 . . . Annular Permanent Magnet;
70, 70B . . . Drive Motor;
71, 71B . . . Drive-Motor Support Block;
72, 72B . . . Drive Shaft; and
80 . . . Bearing Member.

What is claimed is:

1. A permanent magnetic generator comprising:
a base having fixedly a first magnetic body;
a stator member horizontally disposed above the base through support members and has a stator support;
a drive-motor support horizontally disposed and fixed to the support members such that a space is formed about the stator member;
a rotoary shaft penetrates a first center hole formed in the stator support and a second center hole formed in the drive-motor support and is supported by means of bearing;
a rotor fixed to the rotary shaft to be located within the space and has annular permanent magnets that face stator windings of the stator member;
a second magnetic body fixedly attached to a projected lower end of the rotary shaft such that the second magnetic body floats due to a repulsive force generated between the first and second magnetic bodies;
a bearing member attached to the drive-motor support in order to support the rotary shaft urged upward through the second magnetic body; and
a drive motor which is fixed to the drive-motor support and is adapted to rotate the rotary shaft through power transmission means.

2. A permanent magnetic generator according to claim 1, wherein the first magnetic body located adjacent to the base further comprises a stationary yoke formed of iron and having a concave cross section fitted to an upper surface of the base; and a flat permanent maget fixed to an inner wall surface of the stationary yoke and the second magnetic body further comprises; a floating yoke formed of iron and having a concave cross section, in the same manner as the shape of said first magnetic body; and a flat floating magnet fixed to an inner wall surface of the floating yoke.

3. A permanent magnetic generator according to claim 1, wherein the stator member further comprises; a stator support which is supported fixedly by means of support members; a plurality of conductor attachment blocks disposed on an upper surface of the stator support in a circumferential direction such that a predetermined space if formed; and a plurality of stator windings fixedly provided respectively in the conductor attachment blocks.

4. A permanent magnetic generator according to claim 1, wherein the stator member further comprises: a nonmagnet stator support which is supported fixedly by means of support members; a plurality of nonmagnet conductor attachment blocks disposed on an upper surface of the stator support in a circumferential direction such that a predetermined space is formed; and a plurality of elongated tubular-shaped stator windings inserted fixedly respectively into the conductor attachment blocks.

5. A permanent magnetic generator according to claim 1, wherein the rotor further comprises: a rotary plate horizontally disposed and fixed to the rotary shaft; annular steel plates integrally fixed to a lower surface of the rotary plate such that they are opposed to conductor attachment blocks of the stator member, and annular permanent magnets integrally fixed to the lower surface of the rotary plate such that the annular steel plates 64 and the annular permanent magnets are alternately arranged and are opposed to stator windings of the conductor attachment blocks in a non-contacting state.

6. A permanent generator comprising:
a first magnetic body fixedly provided on a base 21,
a stator member horizontally disposed above the base through support members and has a stator support;
a drive-motor support horizontally disposed and fixed to the support members such that a space is formed above the stator member;
a rotarty shaft penetrates a first center hole formed in the stator support and a second center hole formed in the drive-motor support and is supported by means of bearings;
a rotor fixed to the rotary shaft to be located within the space and has annular permanent magnets that face stator windings of the stator member;
a second magnetic body fixedly attached to a projected lower end of the rotary shaft such that the second magnetic body floats due to a repulsive force generated between the first and second magnetic bodies and; and
a drive motor veritcally disposed on the upper surface of the drive-motor support at the center portion thereof through a drive-motor support blocks, having a drive shaft of the drive motor which is coaxial with and connected to the projected tip end of the rotary shaft; which is urged upward through the second magnetic body.

7. A permanent magnetic generator according to claim 6, wherein the rotary shaft includes a projected upper end portion in the shape of a square that is inserting into an insertion hole in the shape of a square of a coupling which is provided fixedly to the drive shaft of the drive motor.

8. A permanent magnetic generator according to claim 6, wherein the rotor has an annular steel plate.

* * * * *